(12) United States Patent
Masson et al.

(10) Patent No.: US 7,117,091 B2
(45) Date of Patent: Oct. 3, 2006

(54) METHOD FOR SIMULATING THE DEPOSITION OF A SEDIMENTARY SEQUENCE IN A BASIN

(75) Inventors: Roland Masson, Paris (FR); Marie-Christine Cacas, Rueil Malmaison (FR); Gabriela Dobranszky, Pontoise (FR)

(73) Assignee: Institut Francais du Petrole, Rueil Malmaison (FR)

( * ) Notice: Subject to any disclaimer, the term of this patent is extended or adjusted under 35 U.S.C. 154(b) by 111 days.

(21) Appl. No.: 10/948,240

(22) Filed: Sep. 24, 2004

(65) Prior Publication Data

US 2005/0065729 A1 Mar. 24, 2005

(30) Foreign Application Priority Data

Sep. 24, 2003 (FR) .................................. 03 11194

(51) Int. Cl.
*G01V 1/28* (2006.01)
*G01V 11/00* (2006.01)
(52) U.S. Cl. ............................................. 702/5; 703/13
(58) Field of Classification Search .................... 702/2, 702/5, 13, 14; 703/9, 10; 367/73
See application file for complete search history.

(56) References Cited

U.S. PATENT DOCUMENTS 5,844,799 A * 12/1998 Joseph et al. .................. 702/2
6,205,402 B1    3/2001 Lazaar et al.
6,754,588 B1 *  6/2004 Cross et al. .................. 702/11
2002/0099504 A1 *  7/2002 Cross et al. .................. 702/2

* cited by examiner

*Primary Examiner*—Donald McElheny, Jr.
(74) *Attorney, Agent, or Firm*—Antonelli, Terry, Stout and Kraus, LLP.

(57) ABSTRACT

The invention is a method relating to the formation by simulation of a reference map of the spatial distribution of the sediment supply, according to the composition thereof, in a sedimentary basin during a sedimentary deposition sequence (during a given geologic time interval) and also allows obtaining the topography of the land surface of the basin at the beginning and at the end of this period. The available input data are a map of the thickness of the sedimentary layer studied, known by interpretation of seismic survey results, data relative to the location and to the composition of the sediment supply at the boundaries of the sedimentary basin being studied, obtained by interpretation of seismic surveys, measurements and observations, and physical parameters characterizing transportation of the sediments (diffusion coefficients in the marine environment and in the continental environment) during the period considered. An application is locating hydrocarbon reservoirs.

7 Claims, 5 Drawing Sheets

Thickness of the sequence studied

Examples of allowable bathymetric profiles

Examples of allowable bathymetric profiles

Examples of allowable bathymetric profiles

Concentration profiles

METHOD FOR SIMULATING THE DEPOSITION OF A SEDIMENTARY SEQUENCE IN A BASIN

BACKGROUND OF THE INVENTION

1. Field of the Invention

The present invention relates to a method for mapping the spatial distribution of the lithologic composition of sediments deposited during a given geologic time interval in a sedimentary basin.

2. Description of the Prior Art

Recent advances in geology, which gave birth during the past twenty years to seismic stratigraphy, then to genetic stratigraphy, have deeply modified understanding of the history of sedimentary filling of sedimentary basins over long time periods and space scales by showing the major influence of two main parameters: the temporal evolution of the topography of the land surface of the basin in relation to the sea level (this topography is referred to hereafter as "bathymetric profile"; the bathymetric profile takes a zero value at any point located at sea level, that is on the coastline) and the sediment supply at the basin boundaries. Many models and notably deterministic numerical models have been developed to allow obtaining the geometric and lithologic implications of these new approaches.

These numerical models simulate transportation and sedimentation (or erosion) of the sediments in the basin on the basis of a description of the nature, from an estimation of the eustasy (sea surface variations recorded simultaneously on the whole land surface), of the subsidence (absolute displacement of the bottom of a sedimentary basin in relation to a fixed reference level in the course of time) and of the sediment supply at the boundaries of the basin studied.

Among these numerical models, the diffusive models have proved efficient through their use in many studies carried out notably for the petroleum industry in order to better (and more readily) identify zones likely to contain hydrocarbons. Such models are described in the document hereafter:

Rivenaes, J. C., 1988, Application of a Dual-Lithology, Depth Dependent Diffusion Equation in Stratigraphic Simulation. Basin Research, 4, 133–146, and in the following patents of the Assignee: U.S. Pat. No. 5,844,799 and French patent application 02/16,456 relating to methods of modelling sedimentary basins filling.

These deterministic numerical models are integrated in a procedure for calibrating their input parameters, referred to as "inversion procedure", shown in FIG. 2. The inversion procedure is intended to adjust the parameters of the model so that the results provided thereby best fit the reality observed. The temporal evolution of the subsidence and of the sea level, that is of the accommodation, is among the parameters to be adjusted. The adjustment criterion for the model obtained is based, among other things, on the capacity of the model to reproduce the geometry, and notably the map of the sedimentary unit thicknesses.

This inversion procedure is in most cases of a "trial-and-error" type, as described for example in the aforementioned French patent application 02/16,456. It can also be automated as described, for example, in French patent 2,776,393 of the Assignee, which relates to a stratigraphic reservoir modelling method, or in the following publication for example:

T. A. Cross and M. A. Lessenger, "Construction and Application of a Stratigraphic Inverse Model", in: Numerical Experiments in Stratigraphy; Recent Advances in Stratigraphic and Sedimentologic Computer Simulations, Special Publication—Society for Sedimentary Geology. 62; pp. 69–83. 1999.

Whatever the method selected, implementation of this inversion procedure is generally very significant because it involves repeated use of the deterministic model. However, although it allows improving the agreement between what is observed and the model obtained, the inversion procedure does not ensure a satisfactory agreement between the result of the model and what is observed.

Notably, the thickness maps for the various sedimentary sequences are generally well constrained in stratigraphic modelling when they result from interpretation of a seismic survey. Now, exact adjustment of the deposition sequence thickness maps of the model to the maps given by seismic interpretation is absolutely not guaranteed by the inversion procedure. In practice, exact adjustment is nearly never reached. In the case of the trial-and-error type method, the success of the procedure entirely depends on the user's know-how and intuition. This also applies to an automatic procedure: it can never succeed if the data initially proposed by the user are too far from the solution.

FIG. 2 illustrates the prior art process which proceeds from beginning point 50 to point 52 where a non-stationary conventional model 52 is provided which is a function of inputs 54 of data for direct calculation which are diffusion coefficients and sediment supply and inversion parameters 56 which are initial paleotopography and an accommodation map which may possibly be sediment supply and diffusion coefficients. Point 52 may provide an output 58 of a lithologic composition map and a final topographic profile. The processing proceeds to point 60 where calculation of the criterion for adjusting the model to the thickness data which is a function of input 62 of data for adjustment calculation which is a thickness map. The process proceeds to criterion test 64. If a criterion test is not performed, the process proceeds to end point 66. If the criterion test 64 is performed, the process proceeds to an inversion loop in which the inversion loop proceeds to point 68 where parameters adjustment is performed which is an input to point 56 where the inversion parameters 56, as described above, are provided. The inversion adjustment 68 proceeds as an input to point 52 as described above.

SUMMARY OF THE INVENTION

The method of the invention allows, as described in detail below, calculation of a model of the multilithologic filling of a sedimentary sequence of a basin from input data of a thickness map of the sedimentary layer studied, from a detailed distribution of the sediment supply in the basin and from physical parameters characterizing the transportation of sediments. It is based on a stationary diffusive process allowing obtaining a strict agreement between the thickness map of a sedimentary sequence of the model and that of the reality observed, without requiring an inversion procedure. The diffusive process used here is referred to as stationary insofar as the rate of sedimentation is assumed to be constant along any vertical of the sequence studied.

According to the method, the thickness map of the sedimentary sequence becomes a datum and not an output. The method directly provides the lithologic composition and bathymetric profile maps at the beginning and at the end of the sequence. Adjustment between the measured thickness map and the map of the model is therefore no longer the object of an inversion whose outcome is uncertain: it is a basic principle of the method. Calibration of the sediment thicknesses by solving an inverse problem is no longer necessary and the bathymetry is an output of the model and no longer an output resulting from an inversion as before.

In other words, the method according to the invention allows simulating the formation of a reference map of the spatial distribution of the sediment supply, according to the composition thereof, in a sedimentary basin during a sedimentary deposition sequence (that is during a geologic time interval). An initial map giving the current thickness of the sedimentary layer is therefore formed by interpretation of data resulting from seismic prospecting surveys and the thickness of the sedimentary layers formed at any time during the sequence is determined by linear time interpolation between the thicknesses of the layers at the beginning and at the end of the sequence. Data relative to the location and to the composition of the sediment supply at the boundaries of the sedimentary basin studied, and to the value of diffusion coefficients characterizing the transportation of sediments to the basin are also gathered on the basis of measurements and interpretations. The input data are then applied to a stationary diffusive model with solution of large-scale diffusive transport equations so as to determine the desired map, as well as the topography of the land surface on the whole of the basin, at the beginning and at the end of the sequence.

According to an implementation mode suitable for cases where the sediment supply is monolithologic, all the intermediate bathymetric profiles between the beginning and the end of each sequence are determined by interpolation, each intermediate profile being obtained by selecting the value of a parameter such as the bathymetry.

According to another implementation mode suitable for cases where the sediment supply is multilithologic with a constant ratio between diffusion coefficients in the marine environment and in the continental environment, all the intermediate bathymetric profiles between the beginning and the end of each sequence are determined by interpolation, each intermediate profile being obtained by selecting the value of a parameter such as the bathymetry.

According to another implementation mode suitable for the more general case where the sediment supply is multilithologic without the previous restrictive condition, a time-dependent family of solutions is formed, by application of the model, by fixing for each one the value of a parameter at any point of the basin, such as the bathymetry.

BRIEF DESCRIPTION OF THE DRAWINGS

Other features and advantages of the method according to the invention will be clear from reading the detailed description hereafter, with reference to the accompanying drawings wherein.

DETAILED DESCRIPTION OF THE INVENTION

The method of the invention allows, as explained below, calculation of a model of the multilithologic filling of a sedimentary sequence of a basin, this term designating the formation of sediments in the basin associated with a geologic time interval during which the sediment supply at the boundaries of the basin and the sea level variation and subsidence rates can be considered to be constant.

Model Input Data

Figure 1:
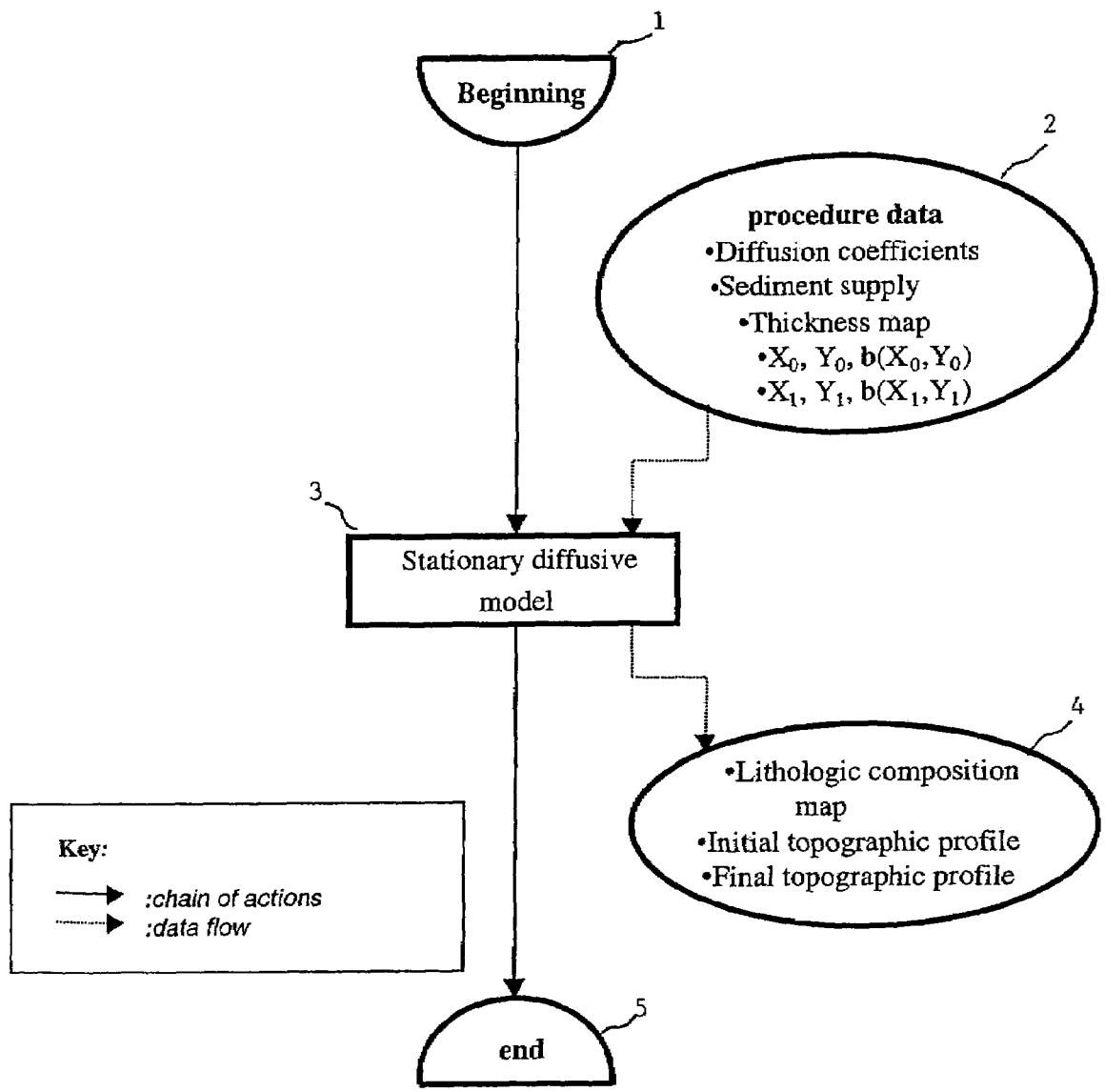
FIG. 1 is the general flowsheet for application of the method according to the invention.
Figure 2:
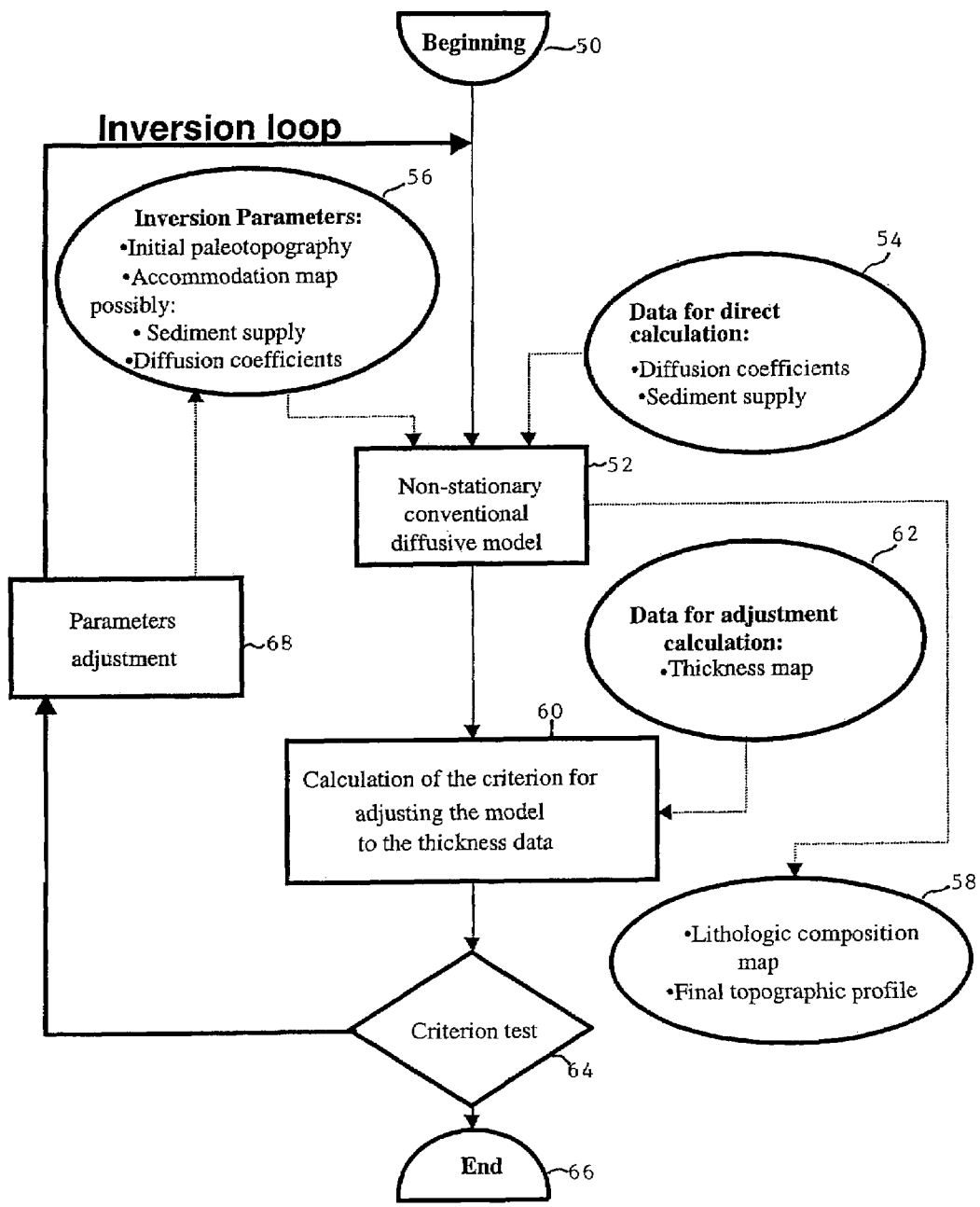
FIG. 2 shows a prior art inversion pattern for the conventional non-stationary diffusive model.

Input data 2 illustrated in FIG. 1 and "procedure data" for the model, are:

1. A map of the thickness of the sedimentary layer being studied, known from interpretation of the results of a seismic survey is utilized. The cumulative values of the map allow calculation of the total volume of sediments introduced i nt he basin during the deposition sequence. It can be noted that this thickness map is generally considered to be the best constrained datum in stratigraphic modelling.

2. A detailed distribution of the sediment supply in the basin, as regards its location in space as well as its lithologic composition is utilized. The proportion of the global volume of sediments carried, at any point of the basin boundary, by rivers or runoff water, is described. Sediments directly incorporated in the basin, as it is the case for the growth of carbonate reefs, can also be taken into account. The sediment supply is also characterized by its lithologic composition (respective proportions of sand, clay and carbonate for example), which is also variable in space. For example, 25% of the sediments can be introduced in a central zone of the basin with a 100% carbonate composition, and 75% of the remaining sediments can be introduced uniformly at the basin boundary and consist of 50% sand and 50% clay. These data are furthermore estimated through the synthesis of seismic survey results, geologic measurements performed on core samples and/or well logs obtained while drilling, and geologic observations on outcrops.

3. Physical parameters characterizing transportation of the sediments (diffusion coefficients in the marine environment and in the continental environment) during the period considered are utilized. More precisely, there are two diffusion coefficients per lithology: a diffusion coefficient valid in the marine environment and a diffusion coefficient valid in an underwater environment (lacustrine or marine). These coefficients quantify the sediment transportation efficiency in continental and marine environments at the geologic period considered.

Application of the Numerical Model 3 Illustrated in FIG. 1

This set of data is applied to a multilithologic diffusive numerical model described in detail hereafter, referred to as "stationary diffusive model" 3 and is suited for sediment transportation modelling. This numerical model is mainly based on the following assumptions:

1. The rate of sedimentation (positive in case of sedimentation, negative in case of erosion) is constant along each vertical of the sequence. It can be specified that this rate of sedimentation, constant in time at any vertical, generally varies laterally.

2. The diffusion coefficients and the sediment supply at the boundaries of the basin (edge flows) or within the basin (source terms) are constant in time during the sequence considered.

3. The last assumption is useful only in case (2) below. In case of erosion, the composition of the eroded lithology is imposed constant along each eroded vertical. In case (2), this is verified by the model if the assumption is true for the first sequence and if the sediments cannot be eroded over more than one lower layer during a sequence.

Numerical Model Outputs 4 Illustrated in FIG. 1

At the output, several cases have to be considered according to whether the stationary diffusive model is applied (1) in a monolithologic context, (2) in a multilithologic context but for all the lithologies, the ratio between the diffusion coefficients in the marine environment and in the continental environment being the same, or (3) in the general multilithologic case.

The model outputs in these three cases are described in detail hereafter. With the previous assumptions, in the general multilithologic case, the model is stationary insofar as the solution in a given time in the sequence considered can be calculated independently of the solutions at the previous times in the sequence.

1) Outputs of the Stationary Diffusive Model in the Monolithologic Case

The model provides a reference map of the spatial distribution of the sediment supply according to the composition thereof $\psi(x, y)$, where x and y are the coordinates in the horizontal plane. By means of arithmetic operations on this reference map, the whole of the bathymetric profiles at any time from the beginning 1 to the end 5 of the sequence, which allow the diffusive process to rigorously satisfy the thickness map of the sequence studied, is directly obtained. The user can then select one of these profiles, by imposing a given bathymetry, at a given point of the basin. For example, the datum of a point on the map located on the coast line at the beginning of the sequence and of another point located on the coast line at the end of the sequence allows calculation of a single initial bathymetric profile and a single final bathymetric profile rigorously satisfying the input data. Similarly, to obtain a single bathymetric profile at any given time of the sequence, the bathymetry has to be imposed for example at a point of the basin at the time considered.

Furthermore, in the monolithologic case, the same reference map $\psi (x, y)$ is valid for any set of diffusion coefficients. The solutions can thus be calculated for other diffusion coefficient sets without re-applying the numerical model.

2) Outputs of the Stationary Diffusive Model, in the Multilithologic Case with a Constant Ratio Between Diffusion Coefficients in the Marine and Continental Environment As in the previous case, the model provides a reference map $\psi (x, y)$ where x and y are the coordinates in the horizontal plane. By means of arithmetic operations on this reference map, a (time-dependent) one-parameter family of bathymetric profiles at any time from the beginning to the end of the sequence is directly obtained, which allows the diffusive process to rigorously satisfy the thickness map of the sequence studied. Besides, the model provides a single map of the lithologic compositions in the sequence. This lithologic composition is constant along a vertical, but laterally variable according to the map provided by the model. Selection by the user of the bathymetric profile at a given time of the sequence can be done as before according to various criteria relative to the bathymetric profile such as, for example, the value of the bathymetry at a point of the basin at the time considered.

3) Outputs of the Stationary Diffusive Model in the General Multilithologic Case The model provides a (time-dependent) one-parameter family of bathymetric profiles and of lithologic compositions that satisfy the sediment thickness map. Unlike the previous two cases, a set of solutions cannot be obtained from a reference map. The numerical model has to be applied to each time by fixing for example the value of the bathymetry at any point of the basin at the time considered, it then provides a single solution. The complete solution will be constructed by time interpolation from calculation of the solutions at the beginning and at the end of the sequence and, if necessary, with a small number of intermediate times.

The Model

Transportation of the sediments is modelled by a multilithologic diffusive model such as those described by Rivenaes, J. C., 1988, or in the aforementioned patents filed by the Assignee. Its precise mathematical formulation is presented notably in the following publication:

Eymard R. et al.: Multilithology Stratigraphic Model under Maximum Erosion Rate Constraint, accepted in Int. J. Numer. Meth. Eng., 2003.

This model calculates at any time the thicknesses of the sediments deposited or eroded, and the lithologic composition of the sediments deposited knowing the supply, the accommodation and the diffusion coefficients. Calibration of the sediment thicknesses can be obtained in this case only by means of an inversion process by inverting for example the accommodation or the bathymetry.

The method is based upon interpolating linearly in time, between each sequence, the sediment thicknesses which therefore become data. The accommodation or the bathymetry are then substituted for them as the new unknown. The model is thus formulated in terms of the new unknowns which are the bathymetry (or deposition profile in the reference plane related to the sea) and the composition. The solutions clearly guarantee by construction respect of the sediment thicknesses of each sequence.

The sedimentation or erosion rate being now known and constant in time, the model is no longer an evolution problem. The diffusive model can therefore be considered to be stationary. In short, calibration of the sediment thicknesses by solving an inverse problem is no longer necessary, and the bathymetry is an output of the model and no longer an output resulting from an inversion, as before.

Figure 3:
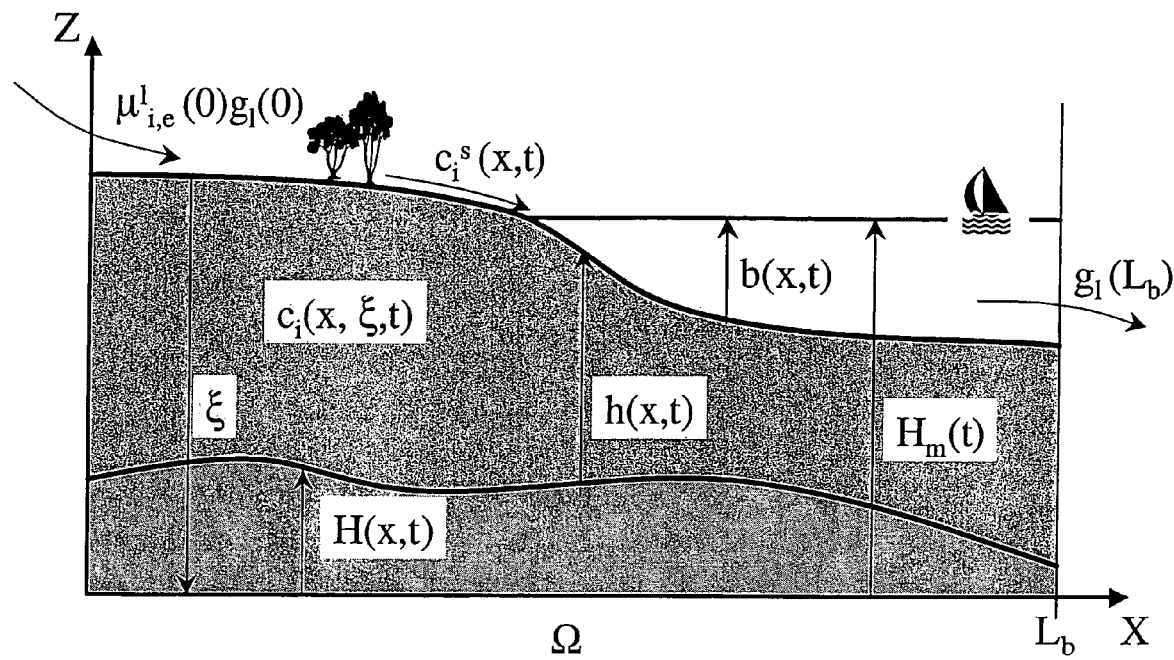
FIG. 3 explains the notations used in chapter "Detailed description"

Notations as Described in FIG. 3

$\Omega$: horizontal projection of the basin.

x: coordinates of a point in $\Omega$ $0<x<L_b$.

z: vertical coordinate of a point of the basin in a fixed reference plane.

$z=H_m(t)$ sea level at the time t.

$z=H(x,t)$ position at the time t of the basement=reference surface subjected to the tectonic vertical displacements.

h(x,t) thickness at the time t of the sediments above the basement.

$b(x,t)=H_m(t)-h(x,t)-H(x,t)$: bathymetry at the time t.

$\xi$: vertical coordinates of a point of the basin in the reference plane having the origin at the top of the basin and pointing downwards ($\xi=z-H(x,t)-h(x,t)$).

L: number of lithologies making up the sediments and bearing indices i=1, . . . , L.

$c_i(x,\xi,t)$: composition in the lithology i of the sediments at the point $(x,\xi)$ of the basin at the time t.

$c_i^s(x,t)$: composition of the sediments at the time t deposited at the surface in case of sedimentation or coming up to the surface in case of erosion.

$n_x$: outgoing normal at the boundary $\partial\Omega$ of the basin.

Data Defined by the User or Parameters to be Calibrated:

l: index of the temporal sequences between the times $t_l$ and $t_{l+1}$ picked by the user.

$e_l(x)=h(x,t_{l+1})-h(x,t_l)$: thickness, given by the user, of the sediments between the times $t_l$ and $t_{l+1}$ (positive in case of sedimentation, negative in case of erosion).

$v_l(x)=e_l(x)/(t_{l+1}-t_l)$ denotes the mean deposition or erosion rate between the times $t_l$ and $t_{l+1}$.

$g_l(x)$: total flow of sediments (incoming <0 or outgoing >0) defined on boundary $\partial\Omega$.

$S_l(x)$: source term of total production (>0) or total consumption (<0) of sediments defined on the domain $\Omega$.

$\partial\Omega_e^l=\{x\in\Omega, g_l(x)<0\}$: incoming sediment boundary.

$\omega_p^l=\{x\in\Omega, S_l(x)>0\}$ sediment production subdomain of $\Omega$.

$$\mu_{i,e}^l(x) \geq 0 \quad \left(\text{with} \sum_{i=1}^{L} \mu_{i,e}^l(x) = 1\right):$$

flow fraction entering lithology i defined on the boundary portion $\partial\Omega_e^l$.

$$\mu_{i,p}^l(x) \geq 0 \quad \left(\text{with} \sum_{i=1}^{L} \mu_{i,p}^l(x) = 1\right):$$

production fraction in lithology i defined on the subdomain $\Omega_p^l$.

$S_i^l(x,t)$ denotes the source term equal to $\mu_{i,p}^l(x) S_l(x)$ on $\Omega_p^l$ and to $c_i^s(x,t) S_l(x)$ on $\Omega/\Omega_p^l$.

Diffusion coefficients of lithology i in marine and continental environments: $k_{i,m}^l$, $k_{i,c}^l$ For each lithology i the function $$\psi_i(b) \text{ is defined} = \begin{cases} -k_{i,m}^l b & \text{if } b > 0, \\ -k_{i,c}^l b & \text{if } b < 0. \end{cases}$$

In case of erosion of the first layer (therefore $v_0(x)<0$), the initial composition at $t_0$ of the eroded sediments has to be specified in column x denoted by $c_i^0(x)$ and assumed to be independent of $\xi$.

Finally, the user must specify by way of example a value of the bathymetry at any point $x_0(t)$ and for any time t denoted by $b_0^l(t)=b(x_0(t),t)$.

Model: it is obtained by assuming that the deposition or erosion rate of the sediments is independent of time during the sequence considered $\partial_t h(x,t)=v_l(x)$ for $t_l<t<t_{l+1}$ The model then determines for any time of the sequence the bathymetry b(x,t), the surface composition $c_i^s(x,t)$ and the composition of the basin $c_i(x,\xi,t)$ solution to the system:

$$\begin{cases} div(-c_i^s(x,t)\nabla_{\psi_i}(b(x,t))) = -v_l(x)c_i(x,0,t) + S_i^l(x,t) & \text{on} \quad \Omega \times (t_l, t_{l+1}), \\ \sum_{i=1}^{L} c_i^s(x,t) = 1 & \text{on} \quad \Omega \times (t_l, t_{l+1}), \\ \sum_{i=1}^{L} -c_i^s(x,t)\nabla_{\psi_i}(b(x,t))n_x = g_l(x) & \text{on} \quad \partial\Omega \times (t_l, t_{l+1}), \\ -c_i^s(x,t)\nabla_{\psi_i}(b(x,t))n_x = \mu_{i,e}^l(x)g_l(x) & \text{on} \quad \partial\Omega_e^l \times (t_l, t_{l+1}), \end{cases}$$

$$\begin{cases} \partial_t c_i(x,\xi,t) + v_l(x)\partial_\xi c_i(x,\xi,t) = 0 & \text{on} \quad \Omega \times (0,+\infty) \times (t_l, t_{l+1}), \\ c_i(x,0,t) = c_i^s(x,t) & \text{if} \quad v_l(x) > 0, \\ c_i(x,\xi,0) = c_i^0(x), \end{cases}$$

$$b(x_0(t),t) = b_0^l(t).$$

Data compatibility condition: a necessary condition on the data for the system to admit a solution is the following compatibility condition $$\int_\Omega v_l(x)dx = \int_\Omega S_l(x)dx - \int_{\partial\Omega} g_l(x)d\sigma$$

which expresses that the algebraic volume of sediments of the sequence is equal to the integral of the total flow on the edge of the basin plus the integral of the production or consumption terms in the basin. It is assumed to be verified in the rest of the paper.

Monolithologic Case L=1

In this case, the system is reduced to:

$$\begin{cases} -\Delta\psi(b(x,t)) = -v_l(x) + S_l(x) & \text{on } \Omega, \\ -\nabla\psi(b(x,t))n_x = g_l(x) & \text{on } \partial\Omega, \\ b(x_0(t),t) = b_0^l(t). \end{cases}$$

It thus is a stationary problem for each time $t \in (t_l, t_{l+1})$ in the sequence. Function $\psi(b(x,t))$ is single solution when the data compatibility condition is verified. It is clearly of the form:

$$\psi(b(x,t)) = \psi_l(x) + f(t)$$

where function f(t) is determined in a single way by the condition $b(x_0(t),t) = b_0^l(t)$. It is thus possible to determine the bathymetry b(x,t) at any time of the sequence by determining function $\psi_l(x)$ in a single stationary calculation by solving the previous system for the unknown $\psi$.

Multilithologic case $L > 1$ with a quotient $\dfrac{k_{i,m}^l}{k_{i,c}^l} = $ r independent of lithology i Let the function $$\psi(b) = \begin{cases} -rb & \text{if } b > 0, \\ -b & \text{if } b < 0 \end{cases}$$

such that $\psi_l(b) = k_{i,c}^l \psi(b)$. It can thus be observed that the problem is again formulated in this case for unknown $\psi$.

With assumption 3 defined above (no erosion over more than one lower layer during the sequence considered), it is shown that solution $\psi(b)$ is of the form:

$$\psi(b(x,t)) = \psi_l(x) + f(t)$$

where function f(t) is determined in a single way by condition $b(x_0(t),t) = b_0^l(t)$.

Furthermore, surface composition $c_i^s(x,t)$ only depends on x and is independent of $b_0^l(t)$. It is denoted $$c_i^s(x,t) = c_i^l(x).$$

It results therefrom that the composition $c_i(x,\xi,t)$ of the sediments deposited (therefore if $v_l(x) > 0$) does not vary vertically and is equal to $c_i^l(x)$.

In this case again, the solution is obtained at any time of the sequence with a single stationary calculation of functions $\psi_l(x)$ and $c_i^l(x)$, i=1, ..., L by solving the system in the unknowns $\psi$ and $c_i^s = 1; \ldots, L$.

Multilithologic General Case

There is a single solution for each time of the system but here the solution throughout the sequence can only be obtained by time interpolation and discretization by calculating the solution at the initial time $t_i$, at the final time $t_{l+1}$ and in a small number of intermediate times in the sequence.

It can however be noted that the bathymetry at the final time of the sequence $b(x,t_{l+1})$ is obtained with a single stationary calculation at the time $t_{l+1}$ which can be carried out independently of the other calculations. Only the calculation of the final composition $c_i(x,\xi,t_{l+1})$ in the column requires this time discretization.

Numerical Scheme

The space scheme is the one described for example in the aforementioned reference Eymard et al. It is similar to the scheme introduced in Rivenaes' paper also mentioned above.

The time scheme in the multilithologic general case is a simple linear interpolation of the solutions obtained at the initial, final and intermediate times.

Application Example

Figure 4:
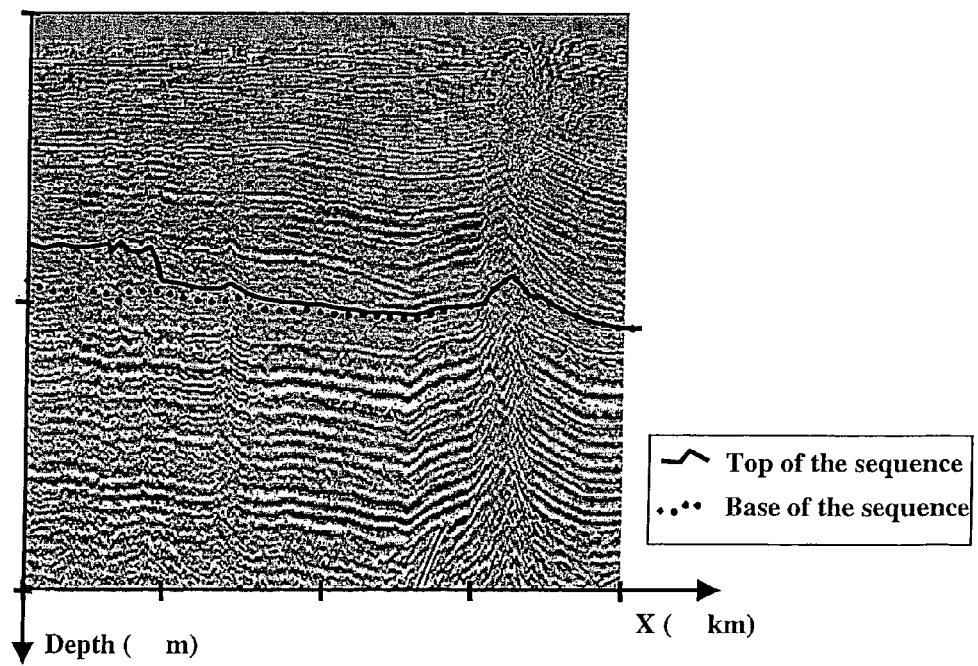
FIG. 4 shows an example of seismic section of the Oman sedimentary basin illustrating the application example.

The following example applies to an Oman sedimentary basin. The medium is assumed to be cylindrical here, that is it remains unchanged in the direction perpendicular to the figures shown. This case is therefore a 2 D case, that is simplified in relation to the 3D general case to which the method applies. The data used come from a seismic line shown in FIG. 4. It is a vertical (Depth) section of the basin along the y axis. The sequence to which the method applies is shown in this figure: it is defined by its upper and lower boundaries (referred to as "top" of the sequence" by a continued line and "base of the sequence" by a doted line respectively).

Figure 5:
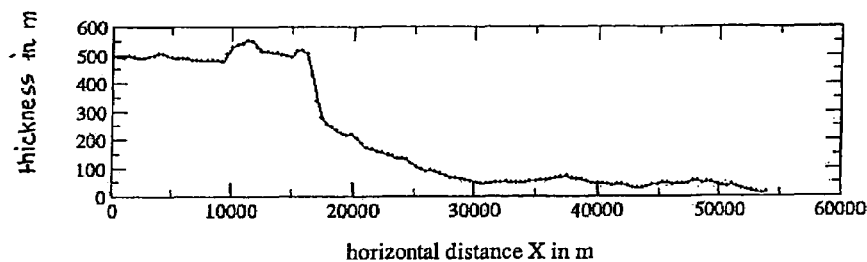
FIG. 5 shows the sedimentary deposit profile of the application example.
Figure 6A:
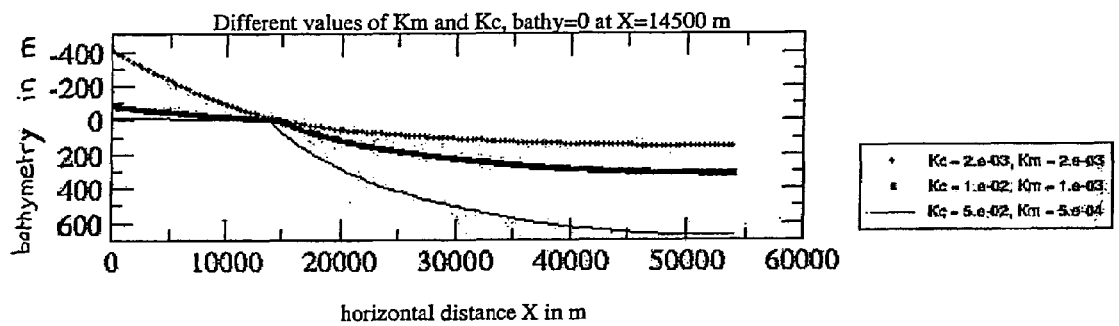
FIGS. 6A and 6B show examples of allowable bathymetric profiles for different marine Km and continental Kc diffusion coefficient values for the application example.

The spatial distribution of the sequence thicknesses is shown in FIG. 5 with the horizontal distance X in meters along the x axis and the vertical thickness in meters along the y axis. The method described above was applied in the monolithologic case, for different selections of diffusion coefficients in the marine environment and in the continental environment. FIG. 6A shows examples of topographic profiles obtained by means of the method, as well as the parameters to which they correspond. These profiles are obtained directly and they all allow obtaining exactly, by diffusion, the thickness distribution observed on the seismic line of FIG. 5, by means of the selection of parameters shown.

Figure 6B:
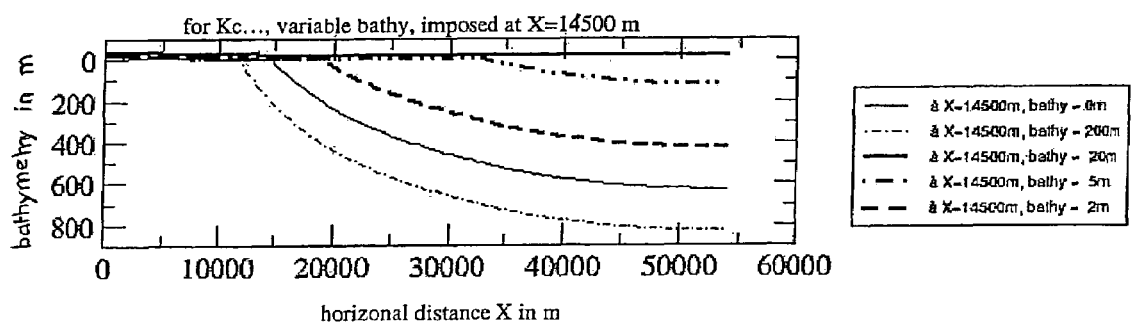

FIG. 6B shows a set of topographic profiles obtained for the same selection of diffusion coefficients, but by varying the reference bathymetry with the horizontal distance x in meters along the X axis and the bathymetry in meters along the y axis. Thus, these topographic profiles show a possible path of the evolution of the bathymetry during deposition of the sequence studied.

Figure 6C:
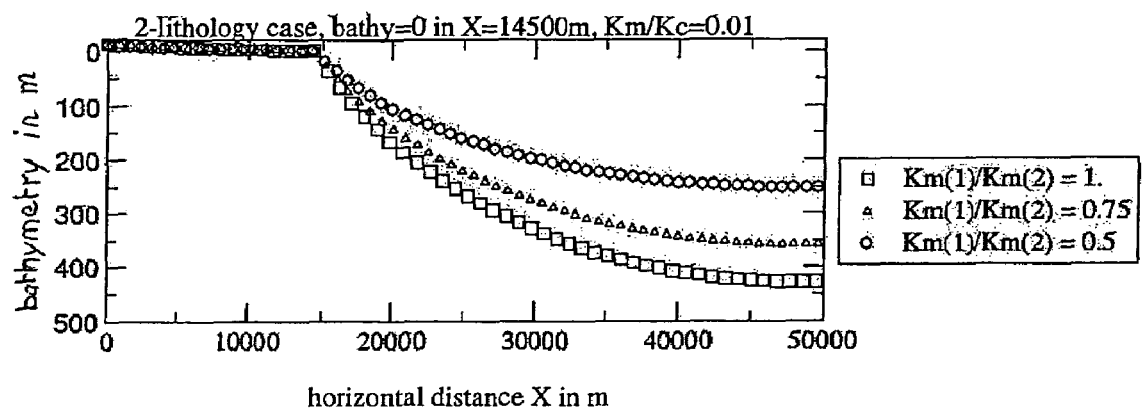
FIGS. 6C and 6D show examples of allowable bathymetric profiles and concentration curves obtained by applying the method in the multilithologic case to the case of the example.
Figure 6D:
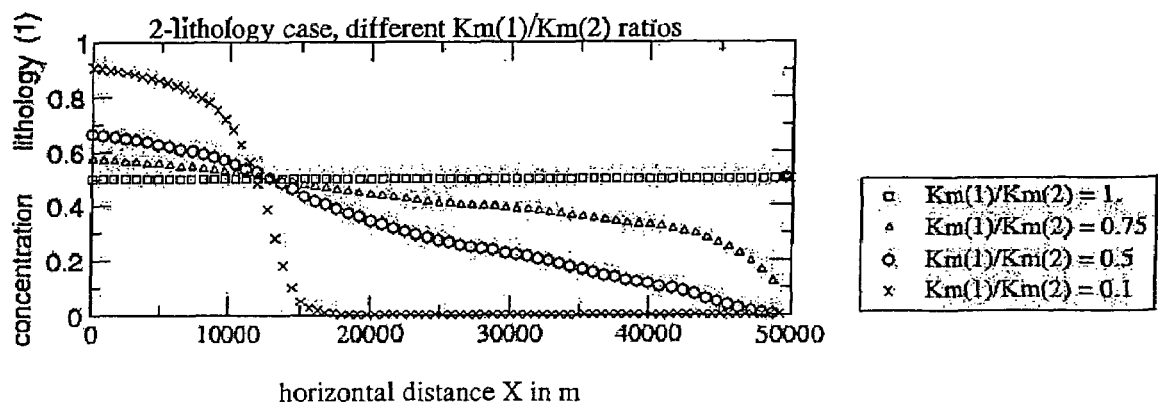

The method described in a multilithologic case was also applied to two lithologies. Incoming compositions of 50% were considered for each lithology and a ratio between the marine and continental diffusion coefficient of 10–2 for each lithology. FIG. 6C shows bathymetric profiles obtained for these parameters by varying the ratio between the marine diffusion coefficients of the two lithologies with the horizontal distance X in meters along the X axis and the bathymetry in meters along the y axis. FIG. 6D shows three concentration profiles of lithology 1, also obtained by varying the ratio between the marine diffusion coefficients of the two lithologies with the horizontal distance X in meters along the X axis and the concentration lithology (1) along the y axis.

The invention claimed is:

1. A method for forming by simulation a reference map of a spatial distribution of a sediment supply, according to a composition thereof, in a sedimentary basin during a sedimentary deposition sequence, comprising:

providing an initial map with a current thickness of sedimentary layers formed by interpretation of data resulting from seismic prospecting surveys and a thickness of the sedimentary layers formed at any time during a sequence being determined by linear time interpolation between thicknesses of the sedimentary layers at a beginning and at an end of the sequence;

gathering data relative to a location and a composition of the sediment supply at boundaries of the sedimentary basin and a value of diffusion coefficients characterizing transportation of sediments to the sedimentary basin on a basis of measurements and interpretations; and applying the data to a stationary diffusive model using diffusive transport equations to determine the reference map and a topography of a land surface of the sedimentary basin, at a beginning and at an end of the sequence.

2. A method as claimed in claim 1, wherein:

when the sediment supply is monolithologic, all intermediate bathymetric profiles between the beginning and the end of the sequence are determined by interpolation and each intermediate profile is obtained by selecting a value of a parameter.

3. A method as claimed in claim 2 wherein:

the parameter is bathymetry.

4. A method as claimed in claim 1, wherein:

when the sediment supply is multilithologic with a constant ratio between diffusion coefficients in a marine environment and in a land environment, all intermediate bathymetric profiles between the beginning and the end of the sequence are determined by interpolation and each intermediate profile is obtained by selecting a value of a parameter.

5. A method as claimed in claim 4 wherein:

the parameter is bathymetry.

6. A method as claimed in claim 5, wherein:

the diffusive model is applied to each time from the beginning to the end of the sequence, by fixing a value of a parameter at any point of the basin, so as to determine a time-dependent family of profiles.

7. A method as claimed in claim 6 wherein:

the parameter is bathymetry.

* * * * *